(12) United States Patent
Seitz

(10) Patent No.: US 8,460,443 B2
(45) Date of Patent: Jun. 11, 2013

(54) PORTABLE DUST COLLECTOR

(75) Inventor: Michael W. Seitz, Houston, TX (US)

(73) Assignee: Jet Flow Dynamics, LLC, Houston, TX (US)

( * ) Notice: Subject to any disclaimer, the term of this patent is extended or adjusted under 35 U.S.C. 154(b) by 20 days.

(21) Appl. No.: 12/998,476

(22) PCT Filed: Oct. 27, 2009

(86) PCT No.: PCT/US2009/005825
§ 371 (c)(1),
(2), (4) Date: Apr. 25, 2011

(87) PCT Pub. No.: WO2010/051019
PCT Pub. Date: May 6, 2010

(65) Prior Publication Data
US 2011/0197767 A1   Aug. 18, 2011

Related U.S. Application Data

(60) Provisional application No. 61/197,376, filed on Oct. 27, 2008.

(51) Int. Cl.
*A47L 5/00* (2006.01)
*B01D 46/02* (2006.01)

(52) U.S. Cl.
USPC ............. 95/280; 95/273; 55/302; 55/341.1; 55/356; 55/428; 55/418; 55/419

(58) Field of Classification Search
USPC ............. 55/283, 302, 467, 482, 484, 356, 55/341.1, 350.1, 357, 378, 433, 472, 385.1, 55/385.3, 314, 319, 323; 95/280, 287, 268; 96/426, 427, 418; 15/304, 340.1; 134/21
See application file for complete search history.

(56) References Cited

U.S. PATENT DOCUMENTS

| | | | | |
|---|---|---|---|---|
| 4,121,915 A * | 10/1978 | Anderson | ...... | 96/245 |
| 4,218,226 A * | 8/1980 | Boozer | ...... | 96/414 |
| 4,227,893 A * | 10/1980 | Shaddock | ...... | 95/268 |
| 4,574,420 A * | 3/1986 | Dupre | ...... | 15/331 |
| 4,578,840 A * | 4/1986 | Pausch | ...... | 15/352 |
| 5,030,259 A * | 7/1991 | Bryant et al. | ...... | 55/302 |

* cited by examiner

*Primary Examiner* — Duane Smith
*Assistant Examiner* — Minh-Chau Pham
(74) *Attorney, Agent, or Firm* — John R. Casperson

(57) ABSTRACT

A portable dust collector comprises a rectangular box-shaped housing containing a rectangular box shaped filter chamber having a dust collection volume in a lower portion thereof and providing plenums for operative gas circulation in a compact environment. The filter chamber shares a portion of the floor with the housing and has a pair of internal parallel sidewalls spaced inwardly from the outside sidewalls of the housing. The internal sidewalls define a plurality of filter chamber dirty gas inlets located just under an apertured cell plate from which the filters hang. The system is provided with a pulse jet cleaning system located in the clean air plenum above the cell plate.

18 Claims, 9 Drawing Sheets

PORTABLE DUST COLLECTOR

This application is a 371 of PCT Application No.: PCT/US2009/005825 filed Oct. 27, 2009 which claims the benefit of U.S. Provisional Application No. 61/197,376 filed Oct. 27, 2008.

TECHNICAL FIELD

This invention relates to a portable dust collector.

BACKGROUND ART

Dust abatement during industrial on-site fabrication, repair, or demolition is a significant problem.

A transportable dust collector which meets size standards for road, sea and train transport and which has the capability of filtering large volumes of air would be very desirable for such applications.

It is an object of this invention to incorporate a dust collector into a shipping container to make it highly portable.

DISCLOSURE OF INVENTION

One embodiment of the invention provides a portable dust collector which includes a rectangular box-shaped housing. The housing is road, sea or train-transportable and has a first end and a second end. A pair of opposed parallel sidewalls, a roof and a floor all extend between the first end and the second end. An endwall seals the second end, and an end closure seals the first end. The housing defines at least one dust collector gas inlet for admitting gas to be filtered and at least one dust collector gas outlet for exhausting filtered gas.

A rectangular box shaped filter and dust-collecting chamber is positioned in a lower portion of the rectangular box-shaped housing. The filter chamber shares a portion of the floor of the housing and is partly defined by a pair of parallel sidewalls spaced inwardly from the sidewalls of the housing. The sidewalls define a plurality of filter chamber dirty gas inlets. An apertured cell plate is spaced inwardly from the roof of the housing and forms a ceiling for the rectangular box-shaped filter and dust-collecting chamber. A pair of lateral dirty gas distribution ducts is defined between the opposed parallel sidewalls of the housing and the opposed pair of parallel sidewalls of the filter chamber. A dirty gas flow path is formed between the lateral dirty gas distribution ducts and the at least one dust collector gas inlet. A clean gas plenum is defined between the cell plate, the ceiling and the roof, and a clean gas flow path is formed between the clean gas plenum and the at least one dust collector gas outlet. The apparatus can be provided with internal blowers and filters and is very compact. Also provided is a method of making the portable dust collector and a method for filtering dust.

BEST MODE FOR CARRYING OUT THE INVENTION

Figure 1:
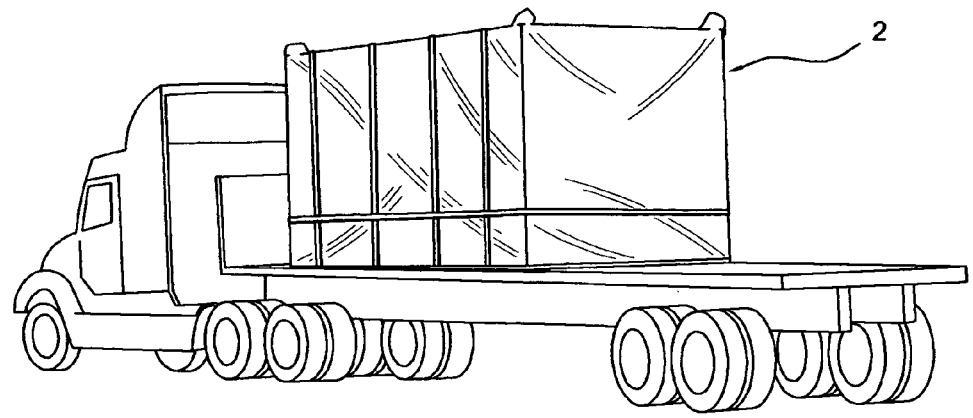
FIG. 1 pictorially illustrates a dust collector according to an embodiment of the invention being transported on a standard flatbed trailer in wrapped condition.
Figure 2:
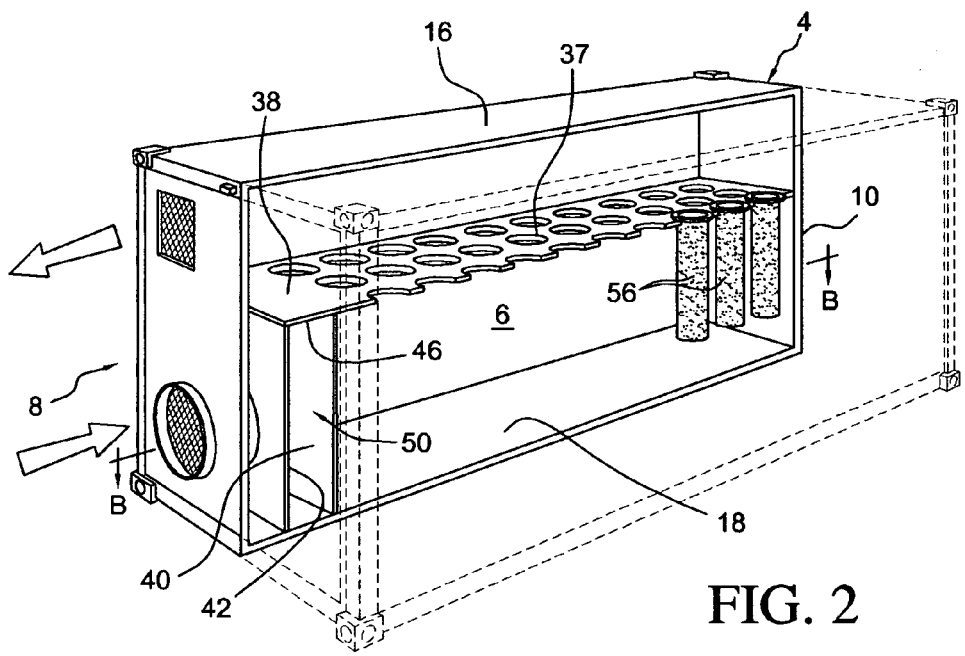
FIG. 2 is a cutaway view of a portion of one embodiment of the dust collector to show certain internal structural elements. The dashed lines show what has been removed.

One embodiment of the invention provides a portable dust collector 2 formed from a rectilinear housing 4. The housing preferably is in the shape of a right cuboid or rectangular box. The housing is road, sea or train-transportable and has a first end 8 and a second end 10. A pair of opposed parallel sidewalls 12, 14, a roof 16 and a floor 18 all extend between the first end and the second end. An endwall 20 seals the second end, and an end closure, which in a preferred embodiment comprises doors 22, 24 seals the first end. These elements are preferably planar in shape.

In a preferred embodiment, the housing is between 16 and 42 feet in length (4.9-12.8 m) and between 6 and 10 feet in width (1.8-3.0 m). A standard shipping container (20 or 40×8×8.5 ft.) (6.1 or 12.2×2.4×2.6 m) can be converted into a suitable housing with good results.

The housing defines at least one dust collector gas inlet 28, 28' for admitting gas to be filtered and at least one dust collector gas outlet 30, 30' for exhausting filtered gas. The inlets and outlets are preferably in the container doors. However, good results can be obtained with a somewhat simpler design with the inlets being though the shipping container end wall. A rectilinear filter and dust-collecting chamber 16 is positioned in a lower portion of the rectilinear housing. The chamber is preferably in the shape of a rectangular box. The filter and dust-collecting chamber preferably shares a portion of the floor with the housing and is partly bounded by a pair of parallel sidewalls 32, 34 spaced inwardly from the sidewalls of the housing. The sidewalls are preferably planar in shape and are parallel to the sidewalls of the housing. The chamber sidewalls define a plurality of filter chamber dirty gas inlets 36. An apertured cell plate 37 is spaced inwardly from the roof of the housing and forms a ceiling for the rectilinear filter and dust-collecting chamber. The cell plate preferably lies in a plane which is parallel to the plane of the roof of the housing and roughly divides the housing into an upper ⅓ and a bottom ⅔. The cell plate attaches to the tops of the chamber sidewalls.

A pair of lateral dirty gas distribution ducts are defined between the opposed parallel sidewalls of the housing and the opposed pair of parallel sidewalls of the filter chamber. A dirty gas flow path is formed between the lateral dirty gas distribution ducts and the at least one dust collector gas inlet. The dirty gas flow path extends from the dirty gas distribution ducts and into the filter chamber via the dirty gas inlets 36. A clean gas plenum is defined between the cell plate and the roof, and a clean gas flow path is formed between the clean gas plenum and the at least one dust collector gas outlet.

Figure 4:
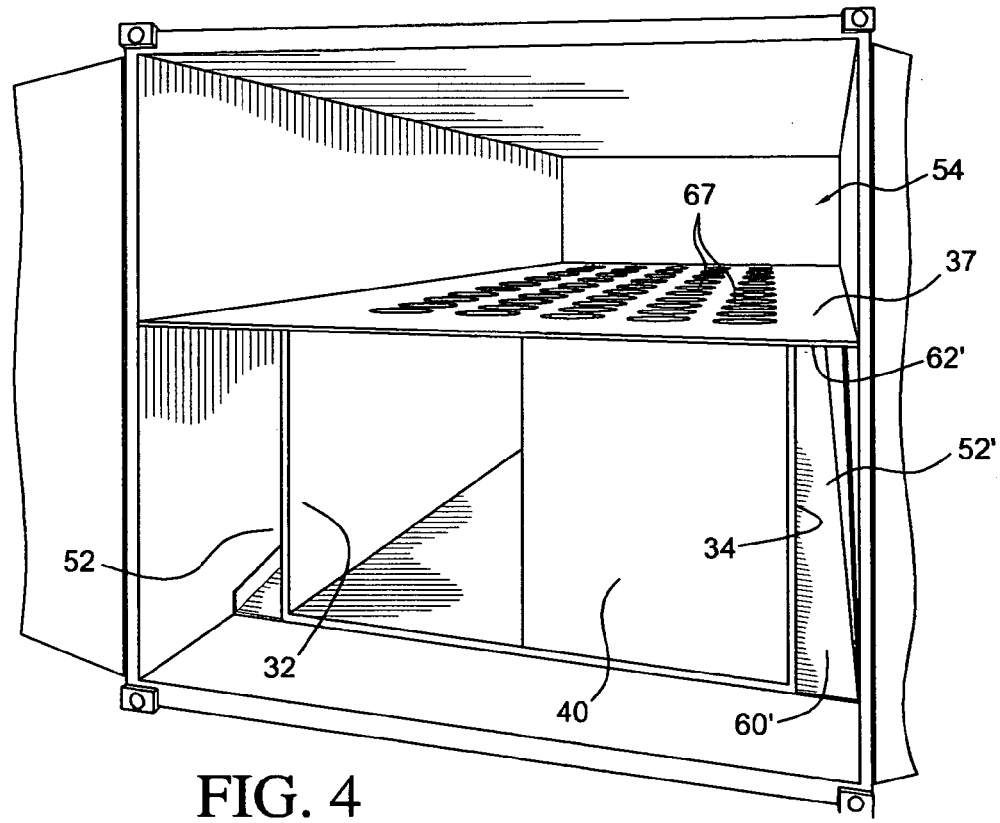
FIG. 4 is a perspective view showing some internal features of an embodiment of the invention. Certain features have been omitted for clarity.
Figure 5:
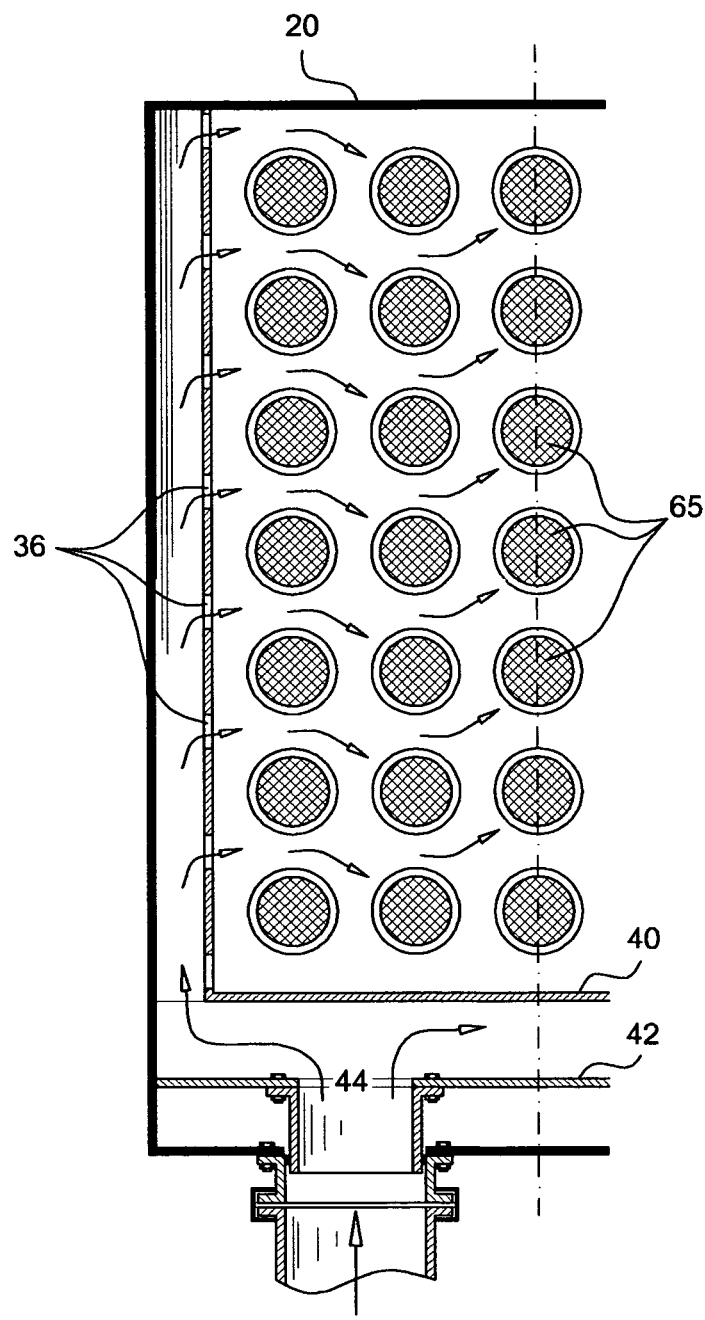
FIG. 5 is a sectional view from the perspective of lines B-B of FIG. 2 of a portion of one embodiment of the invention showing certain structural elements.
Figure 6:
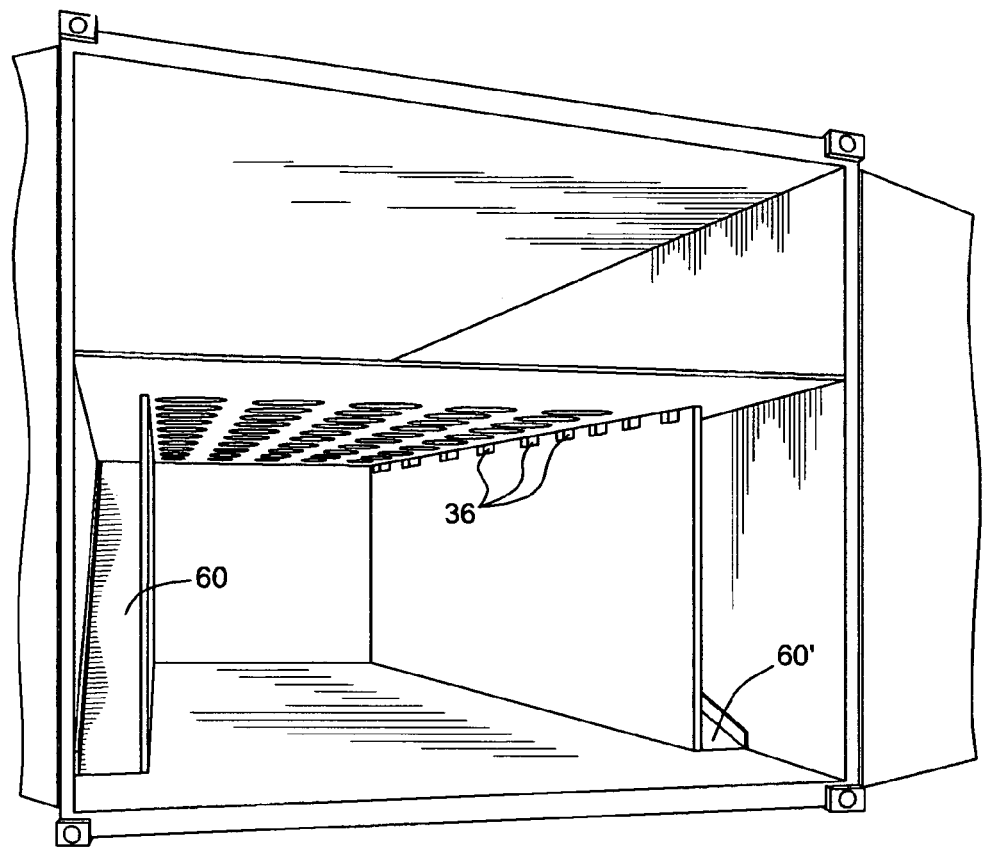
FIG. 6 is a perspective view similar to FIG. 4 of a portion of one embodiment of the invention showing certain internal structural elements. Certain features have been omitted for clarity.

In a preferred embodiment, the end closure is a pair of doors 22, 24 sealing the first end of the housing and defining the dust collector gas inlets 28, 28' for admitting gas to be filtered and the dust collector gas outlet 30, 30' for exhausting the filtered gas. A door end endwall 40 for the filter chamber is spaced inwardly from the end closure, preferably the pair of doors, and connects the cell plate, the floor, and the pair of parallel sidewalls of the filter chamber. The door end endwall is preferably planar and is parallel to the end closure and positioned at a right angle to the cell plate, the floor, and the pair of parallel sidewalls of the filter chamber and forms an endwall for the filter chamber. The door end endwall can be formed from two or more panels if desired to facilitate access to the dust collection chamber. See FIG. 4.

A partition wall 42 connects the pair of opposed parallel sidewalls of the housing and the floor and is positioned between the pair of doors of the housing and the door end endwall of the filter chamber. The partition wall is set inward from the doors only about 4 inches in a preferred embodiment. When the doors are closed, a small clean gas chamber is defined between the doors and the partition wall which is perforated by the dirty gas inlet conduits. The partition wall has an aperture 44 therethrough for each dust collector dirty gas inlet. The partition wall is preferably planar and is parallel to the door end endwall of the filter chamber and the doors of the housing. A ceiling 38 connects an upper end of the partition wall with an upper end of the filter chamber door end endwall. The ceiling extends over an intermediate plenum box 50 between the pair of opposed parallel sidewalls of the housing and can be an imperforate extension of the cell plate for the filter chamber. The ceiling preferably isolates the clean gas flow path from the dirty gas flow path.

Figure 7:
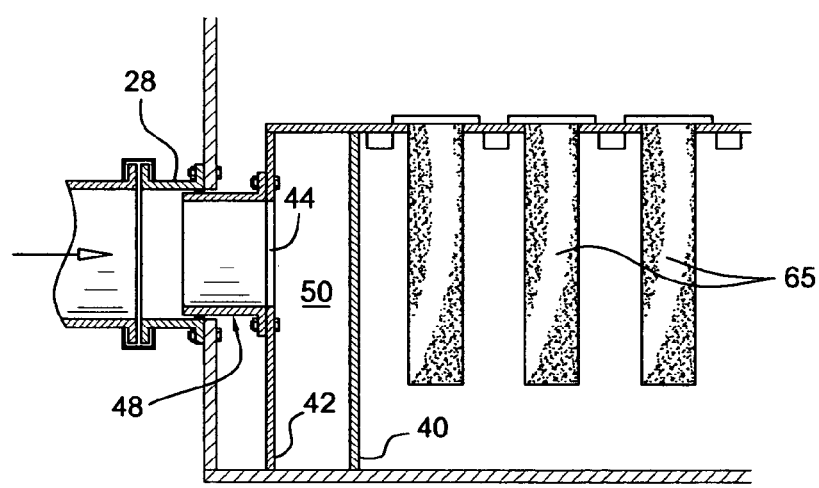
FIG. 7 is a sectional view of a portion of one embodiment of the invention showing certain structural elements.

In one embodiment, a tubular flow path means 48 connects each dust collector inlet in the doors with an aperture in the partition wall and is adapted for sealing when the door is closed. See FIG. 7. An intermediate plenum box 50 is formed between the door end endwall of the filter chamber and the partition wall. In another embodiment, the arrangement is reversed, with the plenum box being adjacent the end wall, with the dust collector inlet being through the end wall. This arrangement avoids the intermediate wall and the tubular flow path means.

A pair of lateral dirty gas distribution ducts 52, 52' are defined between the opposed parallel sidewalls of the housing and the opposed pair of parallel sidewalls of the filter chamber and lead from the intermediate plenum box. See FIG. 4. A clean gas plenum 54 is defined between the cell plate and plenum box ceiling and the roof.

Figure 3:
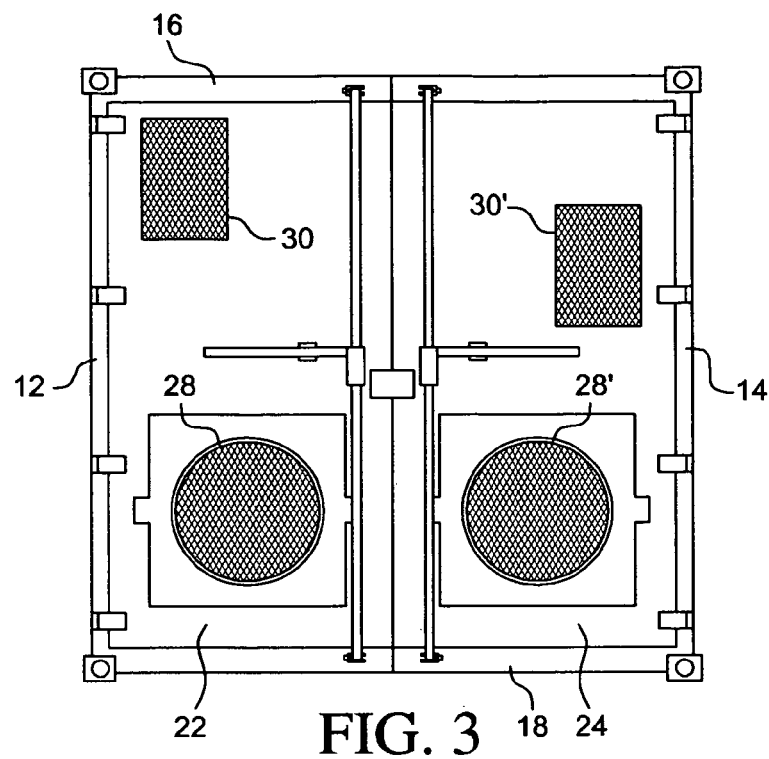
FIG. 3 is a rear view of an embodiment of the invention.
Figure 9:
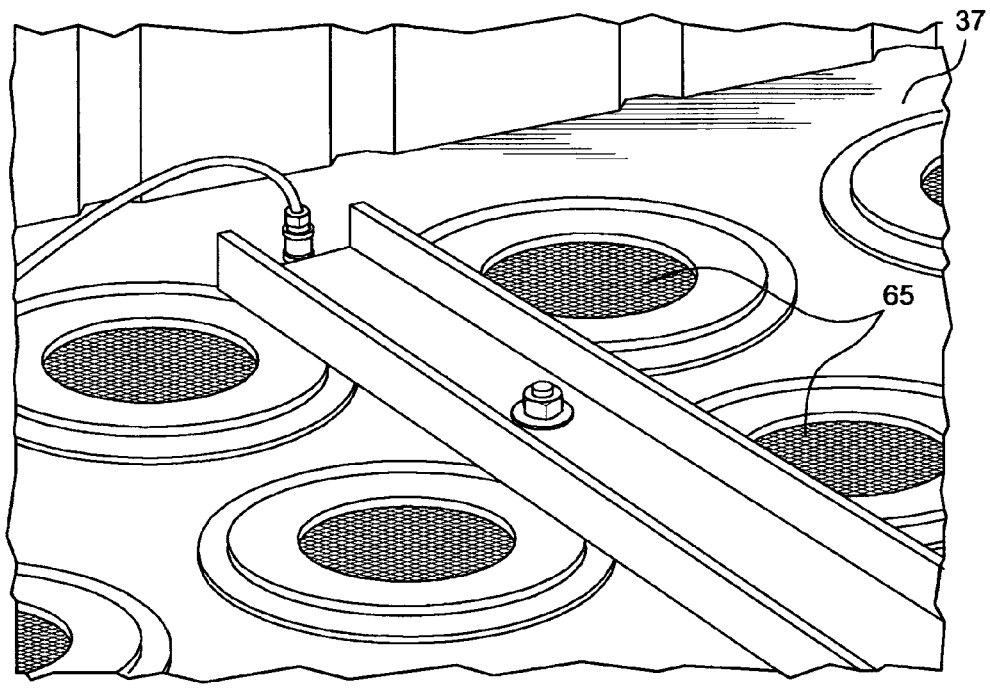
FIG. 9 is a pictorial view of certain internal features of an embodiment of the invention.
Figure 8:
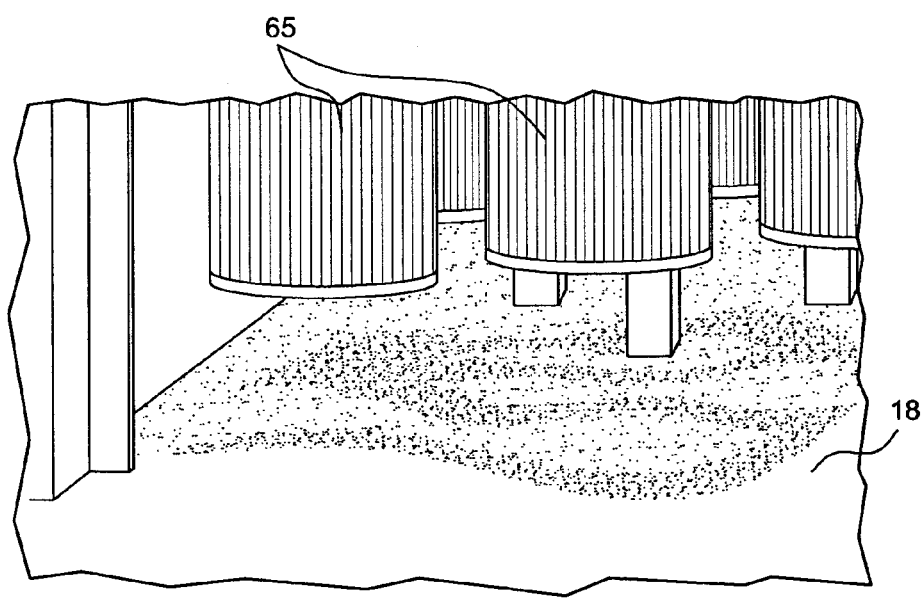
FIG. 8 is a pictorial view of certain internal features of an embodiment of the invention.
Figure 10:
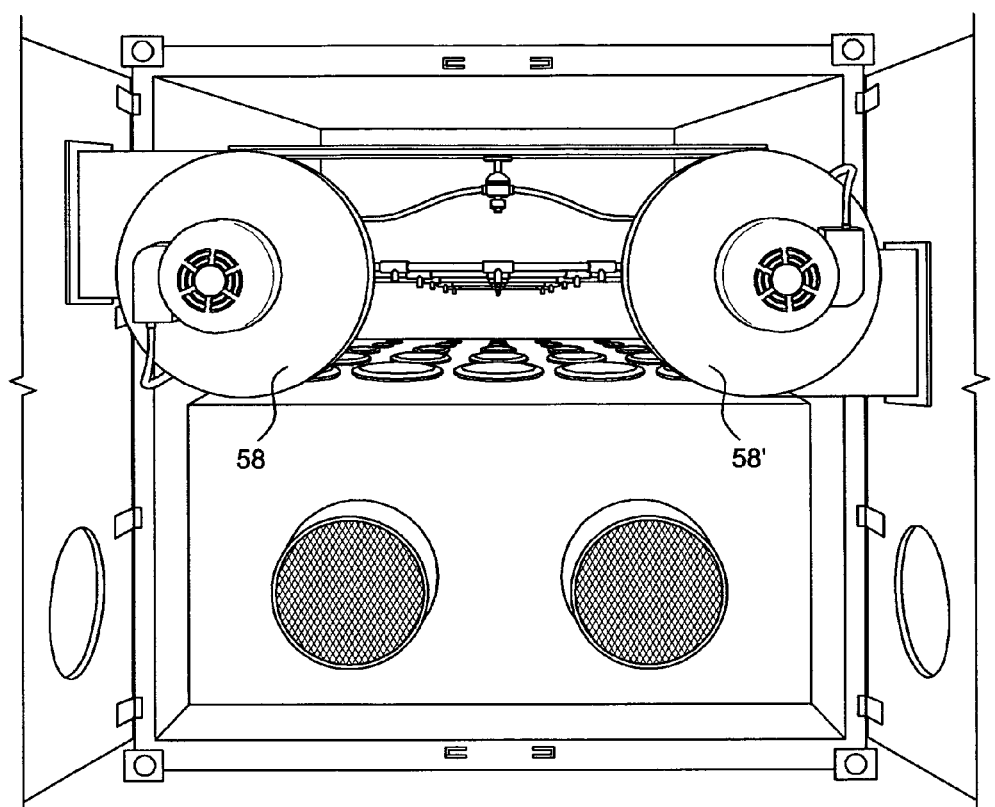
FIG. 10 is an end view of an embodiment of the invention with the doors open.
Figure 11:
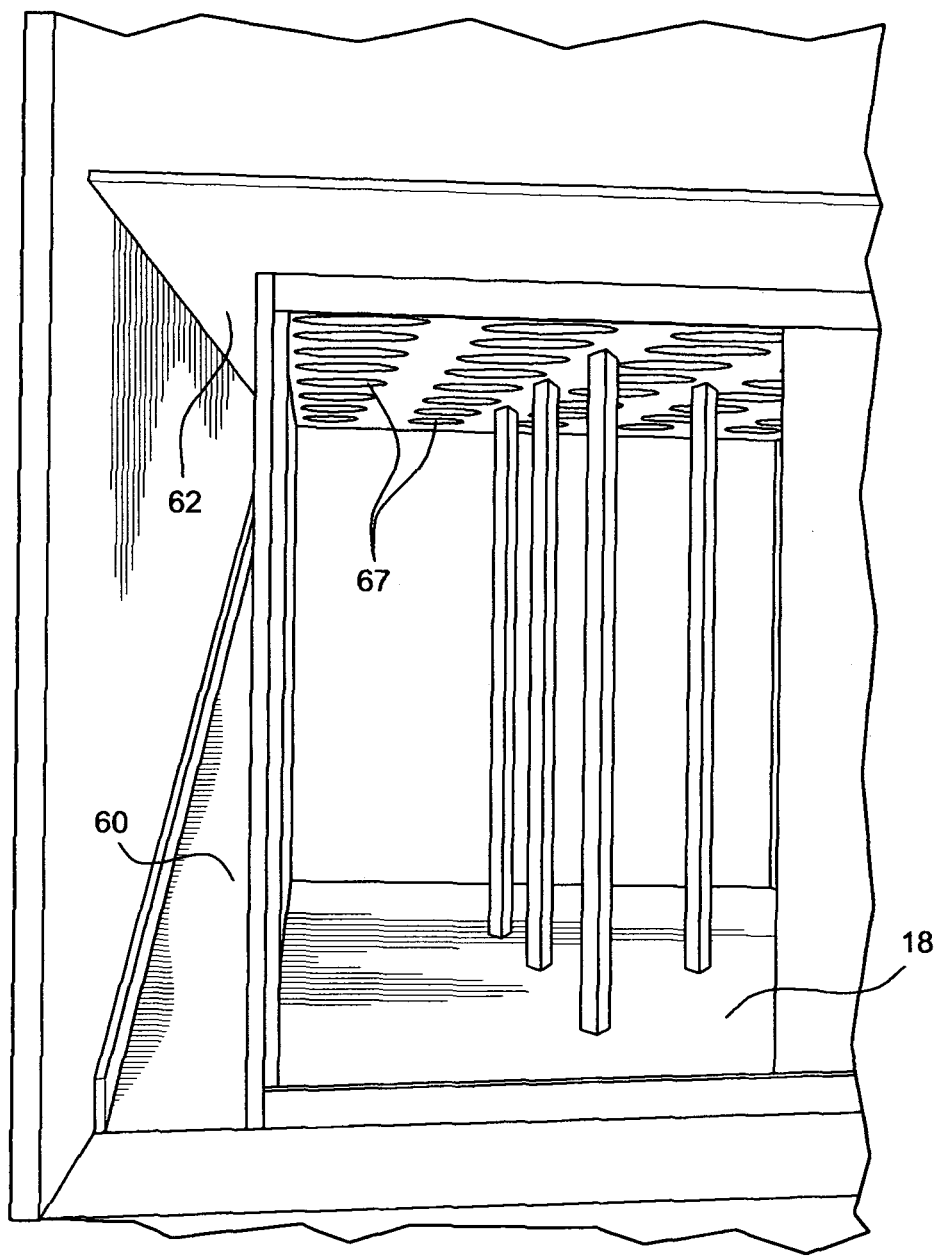
FIG. 11 is a perspective view of certain internal features of an embodiment of the invention similar to FIGS. 4 and 6.

In a preferred embodiment of the invention, the portable dust collector comprises a plurality of filter cartridges 65 positioned in the filter chamber. See FIGS. 8 and 9. The filter cartridges depend from the apertures 67 in the cell plate and are arranged in rows and columns. Each filter comprises a tubular sidewall formed from a filter medium. At least one exhaust fan 58, 58' is positioned to draw dirty gas into the filter chamber through the dust collector inlet and exhaust clean gas from the dust collector outlet. See FIG. 10. In one embodiment of the invention, each exhaust fan is mounted on an inside of one of the doors (See FIG. 10) and discharges filtered gas through one of the dust collector outlets (See FIG. 3). More preferably, each exhaust fan is explosion-proof and is positioned in the clean gas plenum when the doors are in a closed position.

In another preferred embodiment of the invention, the intermediate plenum box ceiling and cell plate lie in the same plane, or nearly the same plane. An upper portion of the dust collector is positioned above the plane of the cell plate and ceiling and a lower portion of the dust collector is positioned below the plane of the cell plate and ceiling. The dust collector has a pair of entry apertures through the doors, one through each door, opening into a lower portion of the dust collector, and a pair of dust collector exhaust outlets through the doors, one through each door, exhausting from the upper portion of the dust collector. A pair of exhaust fans, one carried by each door, is provided for exhausting gas through the outlets, one fan per outlet.

To provide good gas distribution to the filter chamber, the dust collector in one embodiment further comprises a pair of inclined ramps 60, 60' positioned in the pair of lateral dirty gas distribution ducts, one ramp per duct. A pair of imperforate ceilings 62, 62' are positioned in the pair of lateral dirty gas distribution ducts, one ceiling per duct. These ceilings can be extensions of the filter chamber cell plate. The ramps are inclined upwardly along the length of the ducts toward the ceilings from the intermediate plenum so that the ducts converge along their length. It is further preferred that the dirty gas inlets to the filter chamber be positioned near the top end of the filter elements and close to the cell plate and direct dirty gas horizontally into the filter chamber between filter rows, because this arrangement provides a natural downward gas flow across the filters which is the same direction as dust movement during the cleaning cycle, thereby promoting efficient dust transport into the bottom of the chamber. See FIG. 7.

Figure 12:
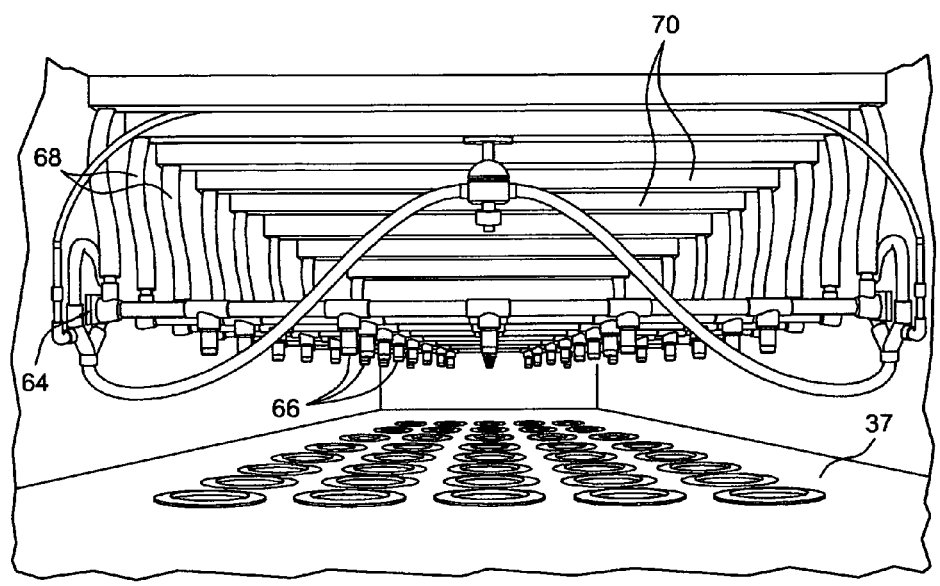
FIG. 12 is a pictorial view of a portion of the invention visible in FIG. 10 with the blowers removed.
Figure 13:
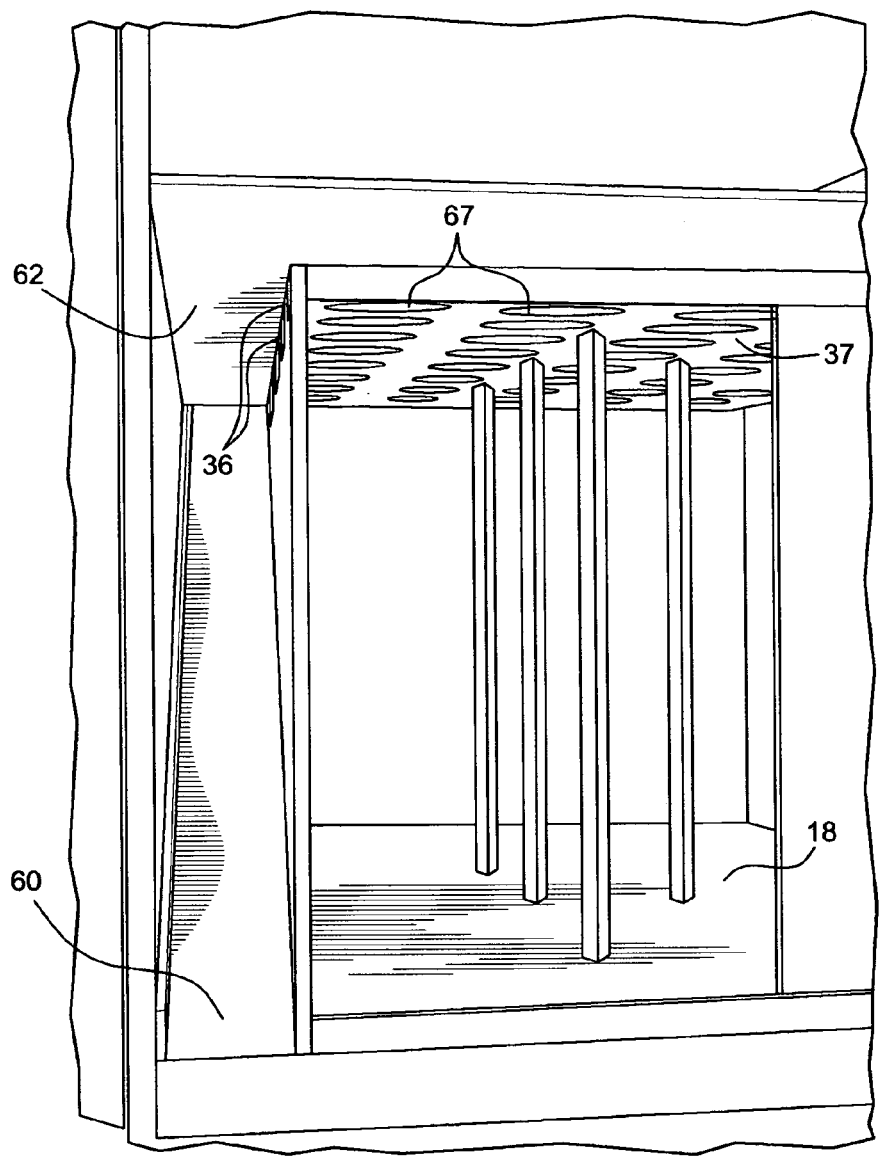
FIG. 13 is a perspective view of certain internal features of an embodiment of the invention similar to FIGS. 4 and 6 and 11.

For cleaning the filter cartridges, the portable dust collector preferably is further provided with a pulse jet cleaning system 64 positioned in the clean gas plenum above the filters. The system comprises a plurality of pulse jet nozzles 66 directed downwardly to pulse gas axially into the tubular filters, at least one nozzle per filter. The pulse dislodges dust cake from the outer surface of the filters and it falls to the floor. The pulse jet cleaning system preferably comprises a tubular manifold system to distribute gas to the nozzles. The tubular manifold system preferably includes rubber hoses 68 to permit components of the cleaning system to be resiliently shifted without tools to permit replacement of the filter cartridges when needed. Tubing members 70 welded tranversely to an underside of the roof provide structural reinforcement and an air reservoir for the conducting of pulse cleaning operations. See FIG. 12.

In operation, air is drawn into the dirty side of the container through two inlet ducts of 24" by fans mounted against the container doors which fit into the clean air plenum area when the doors are closed. The air enters an intermediate plenum (box like partition), being turned 90 degrees to the inlet duct flow direction. Once the air is in the intermediate plenum, it is again turned 90 degrees into two ducts running down the two edges of the container. A small gap exists between the intermediate plenum and the door—this gap is open to the clean side, and is basically the gap between the sealed intermediate plenum and the sealing container door. A connector slip-duct passes from the outside, through the door and traverses the gap and enters the sealed intermediate plenum. To open the door of the container to gain access to the inside of the container, the connector slip duct (2 pieces), is unbolted from the door, and is retracted, leaving a sealing sleeve attached to the intermediate plenum. The slip duct is simply one duct that slips tightly into another duct The fixed half of the duct is shown attached to the bottom section. Once the doors are closed, a second duct is pushed through the door duct openings, and bolted to the door from the outside.

The distribution ducts running the length of the container have outlets to the bin/filter dirty air bottom plenum, which has the filter elements hanging down into it from the dividing cell plate. The filter elements are drop-in filters having a flanged top which seals against the cell plate, the cell plate having holes cut into it that allow the filter to pass through and hang down. The filters are then clamped down onto the cell plate using straddling bars and bolts.

The outlets from the side ducts are a series of orifices/gaps at the top of the duct wall just under the cell plate, so that the air flow is effectively from the top of the filter downward toward the dust collecting bin floor. This down flow direction significantly aids in the natural down-drop of the collected dust on the filter cartridges. The convergence of the side ducts keeps the gas velocity high at the orifices as gas volume bleeds out of the duct into the dirty air plenum through the relatively small top orifices spaced along the length of the ducts. However, good results can also be obtained without converging the side ducts.

Once the dirty air is distributed into the large open dirty air plenum, the air then passes through the filter elements into the open clean air plenum above the filter elements. The dust is collected on the filter cartridge surface. The air in the clean air plenum is then drawn into the fan and expelled from the container.

The current exemplary configuration has a total of 65, 36" long by 12.75" outer diameter filters (91 cm×32.4 cm), arranged five filters wide by 13 rows deep, and a pair of 10,000 cfm (283 m$^3$/min) blower fans. Typical filters that can be used in the preferred design have a cloth area up to 275 ft$^2$/filter, (25.5 m$^2$/filter) which provides a total filter cloth area of 17,875 ft$^2$ (1,661 m$^2$) of filter area. For a flow rate of 20,000 scfm (566 m$^3$/min), the "cloth ratio" of the exemplary embodiment is 1.13. (0.34 metric). This low ratio is ideal so that the flow velocities through the filter fabric are kept low to reduce drag and the deep infiltration of dust into the filter media which would make cleaning less efficient.

Cleaning the floor (pan) of the dirty air plenum (collected dust) can be accomplished by vacuuming through cleaning port holes on the rear side, or gravity dumping through floor ports. To assist in floor dumping, the container can be tilted and vibrated to fluidize the dust. A mechanical drag/scraper can also be fitted. The side-by-side doors can be opened to gain access by a worker if necessary, with the end walls of the dirty plenum also being unboltable for access into the dirty air plenum.

The on-line/off-line filter cleaning pulse-jet system comprises 13 manifolds, one for each row of filters, each manifold comprising a sealed tube "tank" permanently attached to the roof, with 2 fast acting pulse valves, one at each row end, connected below using a section of rubber tube—the two pulse valves and an interconnecting distribution pipe connecting the 2 valves dangling down from the roof. The rubber hoses become "stiff" when pressurized, but are limp and bendable when not being used, to permit servicing of the filters. The distribution pipe has jet orifices, or a series of 5 supersonic nozzles that guide the blast of cleaning air into the throat of the filter cartridge. The pulses occur at regular intervals, for example, every five minutes if all the 26 pulse valves are pulsed simultaneously by a single actuator. There is also a differential pressure gauge that indicates filter blockage and can be used to determine pulse interval.

The following preferred design concepts make the apparatus compact:

1) The inlet diffuser and inlet channels are designed to introduce the air in a very well distributed fashion, allowing the flow of air over the filters to be a true top down configuration, i.e., the flow of air over the cleaning filters is from the top of each filter down. This aids in the natural dropping of dust cake and the pulse jet cleaning of the filters, which is top down, also.

2) The container collects the dust in the dirty air plenum, the bottom of which acts as a base pan, rather than the conventional hopper. Since the air distribution is well distributed, and there is a large volume underneath the filters, and even layer of dust forms in the large pan.

3) The pan is cleaned through sealed openings in the base. The container is raised and tilted, and a vibrator is used to displace the dust into disposable bags.

4) The fans are mounted against the inside of the container doors, so that they are effectively removed when the container doors are opened. External fans are possible, but they would make the unit less compact.

5) The pulse jet system fires the jets simultaneously, although they could be triggered in groups as is more traditional. If triggered together, they improve the cleaning efficiency and simplicity of the system control.

6) The pulse jet system is constructed of vertical rubber hose connectors, so that the jet assemblies can be bent out of the way to enable filter changes.

7) All electrical systems, including the fans, are explosion proof.

8) Access doors are provided within the unit for inspection, cleaning and maintenance of the various chambers of the dust extractor.

The preferred embodiment of the invention provides the following benefits over traditional portable units:

1) Vertical downflow is very efficient for natural dust cake dropping and for pulse cleaning and enables efficient use of the volume below the filters as there is no disturbing air movement.

2) Large base pan for collecting dust

3) Very efficient internal flow distribution ensures even filter use (difficult to achieve in portable units).

4) Single pulse jets cleans very efficiently.

5) Meets all standard commercial shipping requirements, including handling transportation and storage. Fully contained, weather proof.

6) Easy to tarp for advertising purposes.

7) Allows for a large number of filters to be installed. This can also be expressed as a high cloth ratio, which makes the collector suitable for fine dust. By increasing the cloth ratio, velocities through the filter wall are reduced, thereby reducing irreversible filter clogging.

Another embodiment of the invention provides a method for converting a shipping container into a filter dust filtration unit. An inside of the container is divided into an upper portion and a lower portion with an apertured cell plate and ceilings, the cell plate providing flow communication between the upper portion and the lower portion of the thus divided container through its apertures. A filter chamber is positioned in the lower portion of the container beneath the cell plate. The chamber contains a plurality of filters hanging from the cell plate and arranged in rows and columns. The chamber being spaced from the shipping container sidewalls to define two longitudinally extending dirty gas plenums extending alongside, with a plurality of dirty gas apertures leading from the longitudinal dirty gas plenums and into the filter chamber at spaced locations between the rows of filters next to the cell plate. An inlet duct and lateral distributor are positioned to provide for flow of dirty gas into the dirty gas plenums. An exhaust fan is positioned to draw gas through the filters and provide for flow of dirty gas from the inlet duct to the dirty gas plenums, and through the spaced dirty gas apertures and into the filter chamber. Clean gas flows through the upper portion of the container and past the exhaust fan.

In another embodiment of the method of converting a shipping container, a rectangular box-shaped shipping container having a back end wall, a roof, a floor, and a pair of parallel sidewalls, is converted into a dust collector. A generally rectangularly shaped horizontal cell plate is positioned in the shipping container. A short edge of the cell plate abuts the back end wall of the shipping container. The long edges of the cell plate are spaced apart from the shipping container side walls. The horizontal cell plate divides an interior of the shipping container into approximately an upper ⅓ and a lower ⅔. The cell plate has apertures laid out in rows and columns and filters having tubular walls are mounted in the apertures and extend downwardly. Downwardly extending interior side walls are positioned on the long edges of the cell plate. The interior side walls are positioned in parallel planes to the shipping container side walls and extend from the cell plate to the shipping container floor. A pair of side chambers are defined between the interior side walls and the shipping container side walls and apertures are defined through the interior side walls leading from the chambers to the space beneath the cell plate. A downwardly extending filter chamber end wall is positioned on the remaining short unattached edge of the cell plate and extends to the floor to define a box shaped filter and dust collection chamber situated under the cell plate. A planar U-shaped ceiling is attached peripherally to three edges of the cell plate. The ceiling connects the upper ends of the interior side walls to the shipping container side walls and defines a clean gas plenum between the ceiling and cell plate and a roof of the shipping container. An intermediate wall is positioned between the filter chamber end wall and a pair of end doors of the shipping container. The intermediate wall connects a bottom edge of the U-shaped ceiling with the floor of the shipping container. A rectangular box shaped intermediate plenum is defined by the intermediate wall, the filtration chamber end wall, the shipping container side walls, the U shaped ceiling, and the shipping container floor. The intermediate plenum is open to the side chambers, and the intermediate wall has a port for receipt of a dirty gas conduit. A dirty gas conduit extends between at least one of the end doors and the port in the intermediate wall to convey dirty gas from the outside of the shipping container into the intermediate plenum. A blower is positioned to draw clean gas from the clean gas plenum and exhaust clean gas from the shipping container. In this manner, dirty gas can be drawn through the dirty gas conduit and into the intermediate chamber, then laterally to the side chambers, then longitudinally and upwardly to the apertures and into the filtration chamber, then into the filter walls, and clean gas can be drawn from the interior of the filters, upwardly through the cell plate apertures, through the clean gas plenum, and exhausted from the shipping container by the blower.

In another embodiment of the invention, there is provided a method for filtering dust.

In the method, a dust-laden gas stream is introduced into a first end of a rectangular box shaped housing. The dust-laden gas stream is routed into a rectangular box shaped filtration chamber positioned adjacent the opposite end of the housing, in a lower portion of the housing. The gas stream flows from the filtration chamber upwardly through filters into a clean gas plenum positioned in an upper portion of the housing, and is discharged as a clean gas stream from the first end of the rectangular box shaped housing. The dust is filtered from the gas stream in the rectangular box shaped filtration chamber and is preferably drawn through the rectangular box shaped housing by at least one blower positioned in the clean gas plenum. As the gas stream is routed into the filtration chamber, it flows along sidewalls forming an inside surface of the rectangular box shaped housing. The filter chamber contains filters which hang downwardly in the filtration chamber from a cell plate which arranges the filters in rows and columns. The gas stream is introduced into the filtration chamber from a location adjacent the cell plate through a plurality of apertures opening between the rows of filters.

While certain preferred embodiments of the invention have been described herein, the invention is not to be construed as being so limited, except to the extent that such limitations are found in the claims.

The invention claimed is:

1. A portable dust collector comprising
   a road, sea or train-transportable rectangular box-shaped housing having a first end and a second end, a pair of opposed exterior parallel sidewalls, a roof and a floor all extending between the first end and the second end, an endwall sealing the second end, and an end closure sealing the first end, said housing defining at least one dust collector gas inlet for admitting gas to be filtered and at least one dust collector gas outlet for exhausting filtered gas,
   a rectangular box-shaped filter and dust-collecting chamber positioned in a lower portion of the rectangular box-shaped housing, said filter chamber sharing a portion of the floor of the housing and being partly bounded by a pair of interior parallel sidewalls spaced inwardly from the exterior parallel sidewalls of the housing, said interior parallel sidewalls defining a plurality of filter chamber dirty gas inlets, an apertured cell plate spaced inwardly from the roof of the housing forming a ceiling for the rectangular box shaped filter and dust-collecting chamber and adapted for mounting filters to the apertures, the plurality of filter chamber dirty gas inlets opening laterally into the rectangular box shaped filter and dust-collecting chamber from spaced apart positions adjacent the ceiling,
   wherein a pair of lateral dirty gas distribution ducts is defined between the opposed exterior parallel sidewalls of the housing and the opposed pair of interior parallel sidewalls of the filter chamber, and a dirty gas flow path is formed from the at least one dust collector gas inlet, through the pair of lateral gas distribution ducts, and into the rectangular box shaped filter and dust-collecting chamber through the plurality of filter chamber dirty gas inlets, and
   wherein a clean gas plenum is defined between the cell plate and the roof, and a clean gas flow path is formed between the clean gas plenum and the at least one dust collector gas outlet.

2. Apparatus as in claim 1
   wherein the filter chamber further comprises
   a door end endwall spaced inwardly from the end closure and connecting the cell plate, the floor, and the pair of parallel sidewalls of the filter chamber,
   said apparatus further comprising
   a partition wall connecting the pair of opposed parallel sidewalls of the housing and the floor, said partition wall being positioned between the end closure of the housing and the door end endwall of the filter chamber, said partition wall having an aperture therethrough for each dust collector gas inlet, a ceiling plate connecting an upper end of the partition wall with an upper end of the filter chamber door end endwall, said ceiling plate extending between the pair of opposed parallel sidewalls of the housing, and a tubular flow path means connecting each dust collector inlet with an aperture in the partition wall, wherein an intermediate plenum box is formed between the door end endwall and the partition wall.

3. A portable dust collector as in claim 1 further comprising a plurality of filter cartridges each comprising a tubular sidewall formed from a filter medium positioned in the filter chamber, said filter cartridges depending from the apertures in the cell plate and being arranged in rows and columns, and at least one exhaust fan positioned to draw dirty gas into the filter chamber through the dust collector inlet and exhaust clean gas from the dust collector outlet.

4. A portable dust collector as in claim 2 wherein the end closure is formed by a pair of doors, the dust collector gas inlet is formed in one of said pair of doors, the exhaust fan is mounted on an inside of one of the doors for discharging filtered gas through one of the dust collector outlet, and the exhaust fan is positioned in the clean gas plenum when the pair of doors is in a closed position.

5. A portable dust collector as in claim 3 wherein the dirty gas inlets to the filter chamber are positioned near the cell plate and direct dirty gas horizontally into the filter chamber between filter rows.

6. A portable dust collector as in claim 3 further comprising a pulse jet cleaning system positioned in the clean gas plenum and comprising a plurality of pulse jet nozzles directed downwardly to pulse gas axially into the tubular filters, at least one nozzle per filter.

7. A portable dust collector as in claim 6 wherein the pulse jet cleaning system comprises a tubular manifold system to distribute gas to the nozzles, said tubular manifold system including rubber hoses to permit components of the system to be resiliently shifted without removal to permit replacement of the filter cartridges.

8. A portable dust collector as in claim 7 further comprising an air reservoir, valving and control system to simultaneously clean all the filters at the same time.

9. A portable dust collector as in claim 8 wherein the air reservoir forms a part of the roof.

10. A portable dust collector as in claim 9 wherein an underside of the roof carries a plurality of compartments forming the air reservoir.

11. A portable dust collector as in claim 9 wherein the underside of the roof carries a plurality of transversely positioned tubular air reservoirs equal in number to the number of rows of filter cartridges, each air reservoir having a first end and a second end, a pair of hoses form downcomers from each of the air reservoirs, one from each end, each hose having an upper end and a lower end, a tubing extends between the lower ends of each pair of hoses, said tubing being in flow communication with each of the pair of hoses via a fast-acting valve, a plurality of nozzles equal in number to the number of columns of filter cartridges open downwardly from the tubing in alignment with the upper end of the filter cartridges, and an actuator is operatively connected to each of the fast-acting valves to simultaneously open all the valves and clean the filter cartridges.

12. A method for converting a shipping container having a first end and a second end into a dust filtration unit, comprising dividing an inside of the container into an upper portion and a lower portion with an apertured cell plate and ceilings, the apertures of the cell plate providing flow communication between the upper portion and the lower portion of the thus divided container, positioning a rectangular box-shaped filter chamber in the lower portion of the container beneath the cell plate, said chamber containing a plurality of filters hanging from the cell plate and arranged in rows and columns, said chamber being partly defined by filter chamber sidewalls spaced inwardly from the shipping container sidewalls to define two longitudinally extending dirty gas plenums extending one on each side of the filter chamber between the filter chamber sidewalls and the shipping container sidewalls, with a plurality of dirty gas apertures leading from the longitudinal dirty gas plenums and into the filter chamber at spaced locations between the rows of filters next to the cell plate, positioning an inlet duct and lateral distributor in the first end of the shipping container to provide for flow of dirty gas into the dirty gas plenums, positioning an exhaust fan to draw gas through the filters and provide for flow of dirty gas from the inlet duct to the dirty gas plenums, and through the spaced dirty gas apertures and into the filter chamber, and clean gas flow through the upper portion of the container and past the exhaust fan.

13. A method as in claim 12, further comprising providing a rectangular box-shaped shipping container having a back end wall, a roof, a floor, and a pair of parallel sidewalls, positioning a generally rectangularly shaped horizontal cell plate in the shipping container, a short edge of the cell plate abutting the back end wall of the shipping container, the long edges of the cell plate spaced apart from the shipping container side walls, said horizontal cell plate dividing an interior of the shipping container into approximately an upper ⅓ and a lower ⅔, said cell plate having apertures laid out in rows and columns, and filters having tubular walls mounted in the apertures, positioning downwardly extending interior side walls on the long edges of the cell plate, said interior side walls being positioned in parallel planes to the shipping container side walls and extending from the cell plate to the shipping container floor, a pair of side chambers being defined between the interior side walls and the shipping container side walls, wherein apertures are defined through the interior side walls leading from the chambers to the space beneath the cell plate, positioning a downwardly extending filter chamber end wall on the remaining short unattached edge of the cell plate and extending to the floor to define a box shaped filter and dust collection chamber situated under the cell plate, attaching a U-shaped ceiling peripherally to three edges of the cell plate, said ceiling connecting the upper ends of the interior side walls to the shipping container side walls and defining a clean gas plenum between the ceiling and cell plate and a roof of the shipping container, positioning an intermediate wall between the filter chamber end wall and a pair of end doors of the shipping container, said intermediate wall connecting a bottom edge of the U-shaped ceiling with a floor of the shipping container, a rectangular box shaped intermediate plenum being defined by the intermediate wall, the filtration chamber end wall, the shipping container side walls, the U shaped ceiling, and the shipping container floor, said intermediate plenum being open to the side chambers, said intermediate wall having a port for receipt of a dirty gas conduit, positioning a dirty gas conduit between at least one of the end doors and the port in the intermediate wall to convey dirty gas from the outside of the shipping container into the intermediate plenum, and positioning a blower to draw clean gas from the clean gas plenum and exhaust clean gas from the shipping container, whereby dirty gas can be drawn through the dirty gas conduit and into the intermediate chamber, then laterally to the side chambers, then longitudinally and upwardly to the apertures and into the filtration chamber, then into the filter walls, and clean gas can be drawn from the interior of the filters, upwardly through the cell plate apertures, through the clean gas plenum, and exhausted from the shipping container by the blower.

14. A method for filtering dust using the portable dust collector of claim 3, said method comprising introducing a dust-laden gas stream into the first end of the rectangular box shaped housing, routing the dust-laden gas stream into the rectangular box shaped filter and dust-collecting chamber positioned in a lower portion of the housing, flowing the gas stream from the filter and dust-collecting chamber upwardly through the filter medium and into the clean gas plenum, and discharging the clean gas stream from the rectangular box shaped housing.

15. A method as in claim 14 wherein the dust is filtered from the gas stream in the rectangular box shaped filtration chamber.

16. A method as in claim 15 wherein the gas stream is drawn through the rectangular box shaped housing by at least one blower positioned in the clean gas plenum.

17. A method as in claim 14 wherein the gas stream flows to the filter and dust-collecting chamber along sidewalls forming an inside surface of the rectangular box shaped housing.

18. A method as in claim 14 wherein the gas stream is introduced into the filter and dust-collecting chamber from a location adjacent the cell plate through a plurality of apertures opening between the rows of filter cartridges.

* * * * *